(12) United States Patent
Smith et al.

(10) Patent No.: US 11,303,809 B2
(45) Date of Patent: *Apr. 12, 2022

(54) DEPTH SENSING TECHNIQUES FOR VIRTUAL, AUGMENTED, AND MIXED REALITY SYSTEMS

(71) Applicant: Magic Leap, Inc., Plantation, FL (US)

(72) Inventors: Brian Keith Smith, Wellington, FL (US); Koon Keong Shee, Miramar, FL (US); Gregory Michael Link, Half Moon Bay, CA (US)

(73) Assignee: Magic Leap, Inc., Plantation, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/573,891

(22) Filed: Sep. 17, 2019

(65) Prior Publication Data

US 2020/0014849 A1    Jan. 9, 2020

Related U.S. Application Data

(63) Continuation of application No. 15/925,577, filed on Mar. 19, 2018, now Pat. No. 10,455,153.

(Continued)

(51) Int. Cl.
*H04N 5/232*    (2006.01)
*H04N 13/139*    (2018.01)
(Continued)

(52) U.S. Cl.
CPC ....... *H04N 5/23245* (2013.01); *G01S 17/894* (2020.01); *G06F 3/00* (2013.01);
(Continued)

(58) Field of Classification Search
CPC . H04N 5/23245; H04N 13/296; H04N 13/139
See application file for complete search history.

(56) References Cited

U.S. PATENT DOCUMENTS 4,628,312 A   12/1986  Hwang et al.
6,850,221 B1   2/2005  Tickle
(Continued)

FOREIGN PATENT DOCUMENTS

WO    WO 2016/168783    10/2016
WO    WO 2018/175344     9/2019

OTHER PUBLICATIONS

Invitation to Pay Additional Fees And, Where Applicable, Protest Fee for PCT Application No. PCT/US18/23179, mailed May 15, 2018.

(Continued)

*Primary Examiner* — Ryan R Yang
(74) *Attorney, Agent, or Firm* — Knobbe, Martens, Olson & Bear, LLP

(57) ABSTRACT

A system and method for operating a sensor which has at least two modes of operation. The sensor may be provided with one or more common operation steps to be used in both a first mode of operation and a second mode of operation. The sensor may also be provided with one or more dummy operation steps to be used in the second mode of operation but not the first mode of operation. The dummy operation steps can convert the first mode of operation to the second mode of operation when used with the one or more common operation steps.

20 Claims, 9 Drawing Sheets

Illustration of Timing Diagram

- $T_{LR\,int}$: Integration time or exposure time in long range mode.
- $T_{SR\,int}$: Integration time or exposure time in short range mode.
- $T_{eye\_safe\_dummy}$: Time introduced between long range mode and short range mode to avoid triggering eye-safe circuit and to ensure eye-safe operation.
- $T_{FastRateSR\_fps}$: Period for high frame rate short range mode from Table 2.
- $T_{SlowRateSR\_fps}$: Period for low frame rate short range mode from Table 2.
- $T_{fps}$: Period for the mode indicated.
- F1: Modulation frequency 1.
- F2: Modulation frequency 2.

Related U.S. Application Data

(60) Provisional application No. 62/474,503, filed on Mar. 21, 2017.

(51) Int. Cl.
*H04N 13/296* (2018.01)
*G06F 3/00* (2006.01)
*G01S 17/894* (2020.01)

(52) U.S. Cl.
CPC ..... *H04N 5/232125* (2018.08); *H04N 13/139* (2018.05); *H04N 13/296* (2018.05)

(56) References Cited

U.S. PATENT DOCUMENTS

| | | | |
|---|---|---|---|
| D514,570 S | 2/2006 | Ohta | |
| 9,081,426 B2 | 7/2015 | Armstrong | |
| 9,215,293 B2 | 12/2015 | Miller | |
| D752,529 S | 3/2016 | Loretan et al. | |
| 9,348,143 B2 | 5/2016 | Gao et al. | |
| D759,657 S | 7/2016 | Kujawski et al. | |
| 9,417,452 B2 | 8/2016 | Schowengerdt et al. | |
| 9,470,906 B2 | 10/2016 | Kaji et al. | |
| 9,547,174 B2 | 1/2017 | Gao et al. | |
| 9,671,566 B2 | 6/2017 | Abovitz et al. | |
| D794,288 S | 8/2017 | Beers et al. | |
| 9,740,006 B2 | 8/2017 | Gao | |
| 9,791,700 B2 | 10/2017 | Schowengerdt et al. | |
| D805,734 S | 12/2017 | Fisher et al. | |
| 9,851,563 B2 | 12/2017 | Gao et al. | |
| 9,857,591 B2 | 1/2018 | Welch et al. | |
| 9,874,749 B2 | 1/2018 | Bradski | |
| 10,455,153 B2 | 10/2019 | Smith et al. | |
| 10,477,157 B1 * | 11/2019 | Shahdi | H04N 13/239 |
| 2012/0127062 A1 | 5/2012 | Bar-Zeev et al. | |
| 2012/0232397 A1 | 9/2012 | Ohshima | |
| 2013/0082922 A1 | 4/2013 | Miller | |
| 2013/0117377 A1 | 5/2013 | Miller | |
| 2013/0125027 A1 | 5/2013 | Abovitz | |
| 2013/0271629 A1 | 10/2013 | Sambonsugi | |
| 2014/0071539 A1 | 3/2014 | Gao | |
| 2014/0177023 A1 | 6/2014 | Gao et al. | |
| 2014/0218468 A1 | 8/2014 | Gao et al. | |
| 2014/0240492 A1 | 8/2014 | Lee | |
| 2014/0241614 A1 | 8/2014 | Lee | |
| 2014/0267420 A1 | 9/2014 | Schowengerdt | |
| 2014/0306866 A1 | 10/2014 | Miller et al. | |
| 2015/0016777 A1 | 1/2015 | Abovitz et al. | |
| 2015/0103306 A1 | 4/2015 | Kaji et al. | |
| 2015/0178939 A1 | 6/2015 | Bradski et al. | |
| 2015/0205126 A1 | 7/2015 | Schowengerdt | |
| 2015/0222883 A1 | 8/2015 | Welch | |
| 2015/0222884 A1 | 8/2015 | Cheng | |
| 2015/0268415 A1 | 9/2015 | Schowengerdt et al. | |
| 2015/0302652 A1 | 10/2015 | Miller et al. | |
| 2015/0309263 A2 | 10/2015 | Abovitz et al. | |
| 2015/0326570 A1 | 11/2015 | Publicover et al. | |
| 2015/0346490 A1 | 12/2015 | TeKolste et al. | |
| 2015/0346495 A1 | 12/2015 | Welch et al. | |
| 2016/0011419 A1 | 1/2016 | Gao | |
| 2016/0026253 A1 | 1/2016 | Bradski et al. | |
| 2018/0278843 A1 | 9/2018 | Smith | |

OTHER PUBLICATIONS

International Search Report and Written Opinion for PCT Application No. PCT/US18/23179, dated Jul. 6, 2018.

International Preliminary Report on Patentability for PCT Application No. PCT/US18/23179, dated Sep. 24, 2019.

Adeva, et al., "Efficient Architecture for Soft-Input Soft-Output Sphere Detection with Perfect Node Enumeration," IEEE Transactions on Very Large Scale Integration (VLSI) Systems, vol. XX, No. X, XXX, Jun. 8, 2015.

* cited by examiner

| Configuration Sequence Number | Sequence Type |
|---|---|
| 0 | Low Frame Rate Long Range DUMMY Frame |
| 1 | Long Range Sub-frame 1 |
| 2 | Long Range Sub-frame 2 |
| : | : |
| m | Long Range Sub-frame m |
| m+1 | Eye Safe DUMMY Frame |
| m+2 | Short Range Sub-frame 1 |
| m+3 | Short Range Sub-frame 2 |
| : | : |
| m+n+1 | Short Range Sub-frame m |
| m+n+2 | Low Frame Rate Short Range DUMMY Frame |

FIG. 7

| Configuration Sequence Range | Mode |
|---|---|
| 0 through m | Low Frame Rate Long Range |
| 1 through m | High Frame Rate Long Range |
| (m+2) through (m+n+2) | Low Frame Rate Short Range |
| (m+2) through (m+n+1) | High Frame Rate Short Range |
| 1 through (m+n+2) | Interleaved Low Frame Rate Short and Long |

DEPTH SENSING TECHNIQUES FOR VIRTUAL, AUGMENTED, AND MIXED REALITY SYSTEMS

INCORPORATION BY REFERENCE TO ANY PRIORITY APPLICATIONS

This application is a continuation of U.S. patent application Ser. No. 15/925,577, filed Mar. 19, 2018, and entitled "DEPTH SENSING TECHNIQUES FOR VIRTUAL, AUGMENTED, AND MIXED REALITY SYSTEMS," which claims priority to U.S. Provisional Application No. 62/474,503, filed Mar. 21, 2017, and entitled "DEPTH SENSING TECHNIQUES FOR VIRTUAL, AUGMENTED, AND MIXED REALITY SYSTEMS." These and any other applications for which a foreign or domestic priority claim is identified in the Application Data Sheet as filed with the present application are hereby incorporated by reference under 37 CFR 1.57.

BACKGROUND

Field

This disclosure relates to depth sensors, such as those which may be used in virtual reality, augmented reality, and mixed reality imaging and visualization systems.

Description of the Related Art

Modern computing and display technologies have facilitated the development of virtual reality, augmented reality, and mixed reality systems. Virtual reality, or "VR," systems create a simulated environment for a user to experience. This can be done by presenting computer-generated imagery to the user through a head-mounted display. This imagery creates a sensory experience which immerses the user in the simulated environment. A virtual reality scenario typically involves presentation of only computer-generated imagery rather than also including actual real-world imagery.

Augmented reality systems generally supplement a real-world environment with simulated elements. For example, augmented reality, or "AR," systems may provide a user with a view of the surrounding real-world environment via a head-mounted display. However, computer-generated imagery can also be presented on the display to enhance the real-world environment. This computer-generated imagery can include elements which are contextually-related to the real-world environment. Such elements can include simulated text, images, objects, etc. Mixed reality, or "MR," systems are a type of AR system which also introduce simulated objects into a real-world environment, but these objects typically feature a greater degree of interactivity. The simulated elements can often times be interactive in real time.

FIG. 1 depicts an example AR/MR scene 1 where a user sees a real-world park setting 6 featuring people, trees, buildings in the background, and a concrete platform 20. In addition to these items, computer-generated imagery is also presented to the user. The computer-generated imagery can include, for example, a robot statue 10 standing upon the real-world platform 20, and a cartoon-like avatar character 2 flying by which seems to be a personification of a bumblebee, even though these elements 2, 10 are not actually present in the real-world environment.

SUMMARY

Methods for configuring a sensor are disclosed. In some embodiments, a method comprises: providing a sensor with one or more common operation steps to be used in both a first mode of operation and a second mode of operation; and providing the sensor with one or more dummy operation steps to be used in the second mode of operation but not the first mode of operation, wherein the one or more dummy operation steps convert the first mode of operation to the second mode of operation when used with the one or more common operation steps.

Sensing systems are disclosed. In some embodiments, a system comprises: a sensor; and a processor configured to provide the sensor with one or more common operation steps to be used in both a first mode of operation and a second mode of operation; and to provide the sensor with one or more dummy operation steps to be used in the second mode of operation but not the first mode of operation, wherein the one or more dummy operation steps convert the first mode of operation to the second mode of operation when used with the one or more common operation steps.

BRIEF DESCRIPTION OF THE DRAWINGS

FIG. 7 is an example table showing common operation steps and dummy operation steps for multiple depth sensing modes.

DETAILED DESCRIPTION

Virtual reality (VR), augmented reality (AR) and mixed reality (MR) systems can include a display which presents computer-generated imagery to a user. In some embodiments, the display systems are wearable, which may advantageously provide a more immersive VR/AR/MR experience. The computer-generated imagery provided via the display can create the impression of being three-dimensional. This can be done, for example, by presenting stereoscopic imagery to the user.

Figure 1:
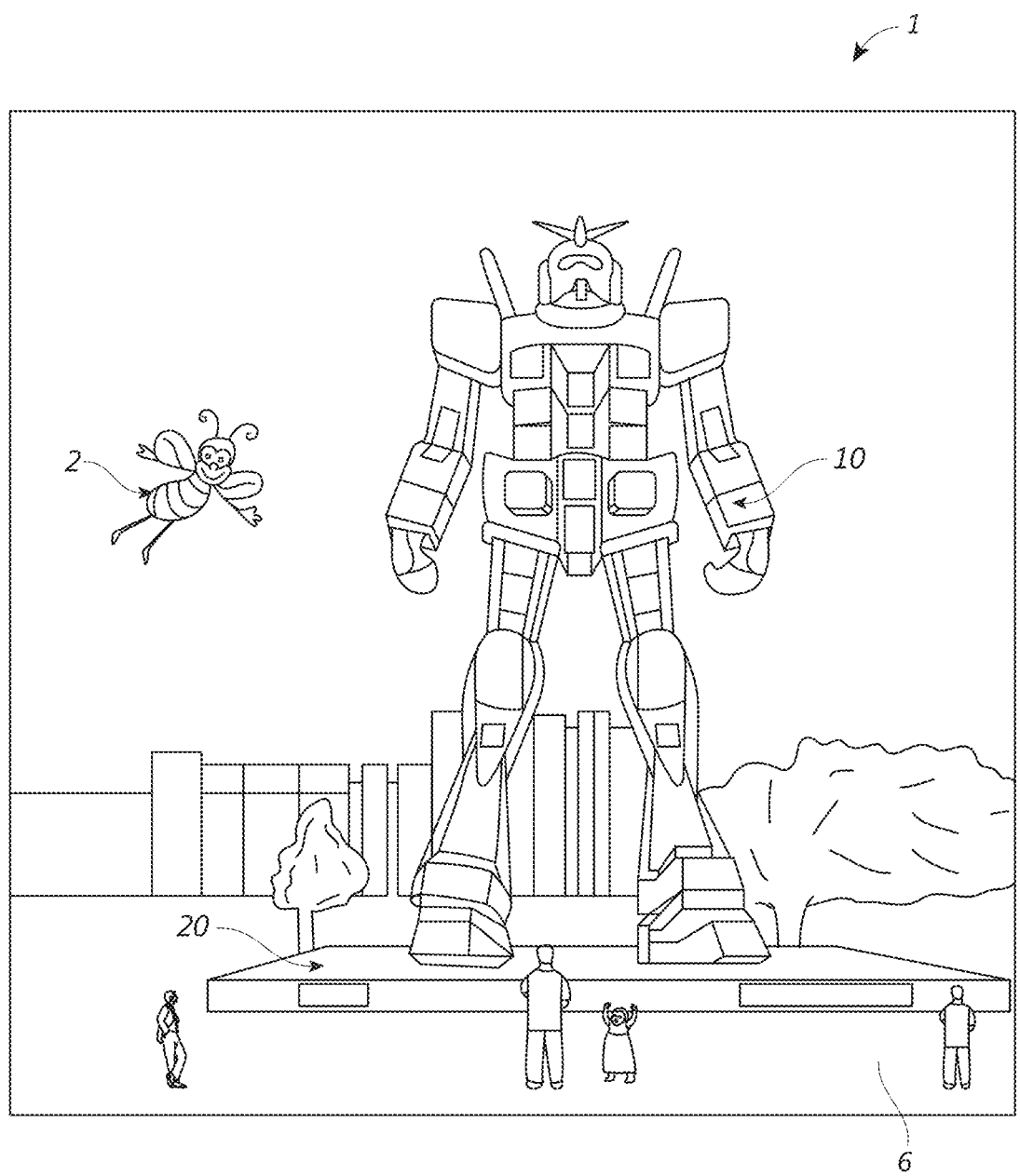
FIG. 1 illustrates a user's view of an augmented reality (AR) scene using an example AR system.
Figure 2:
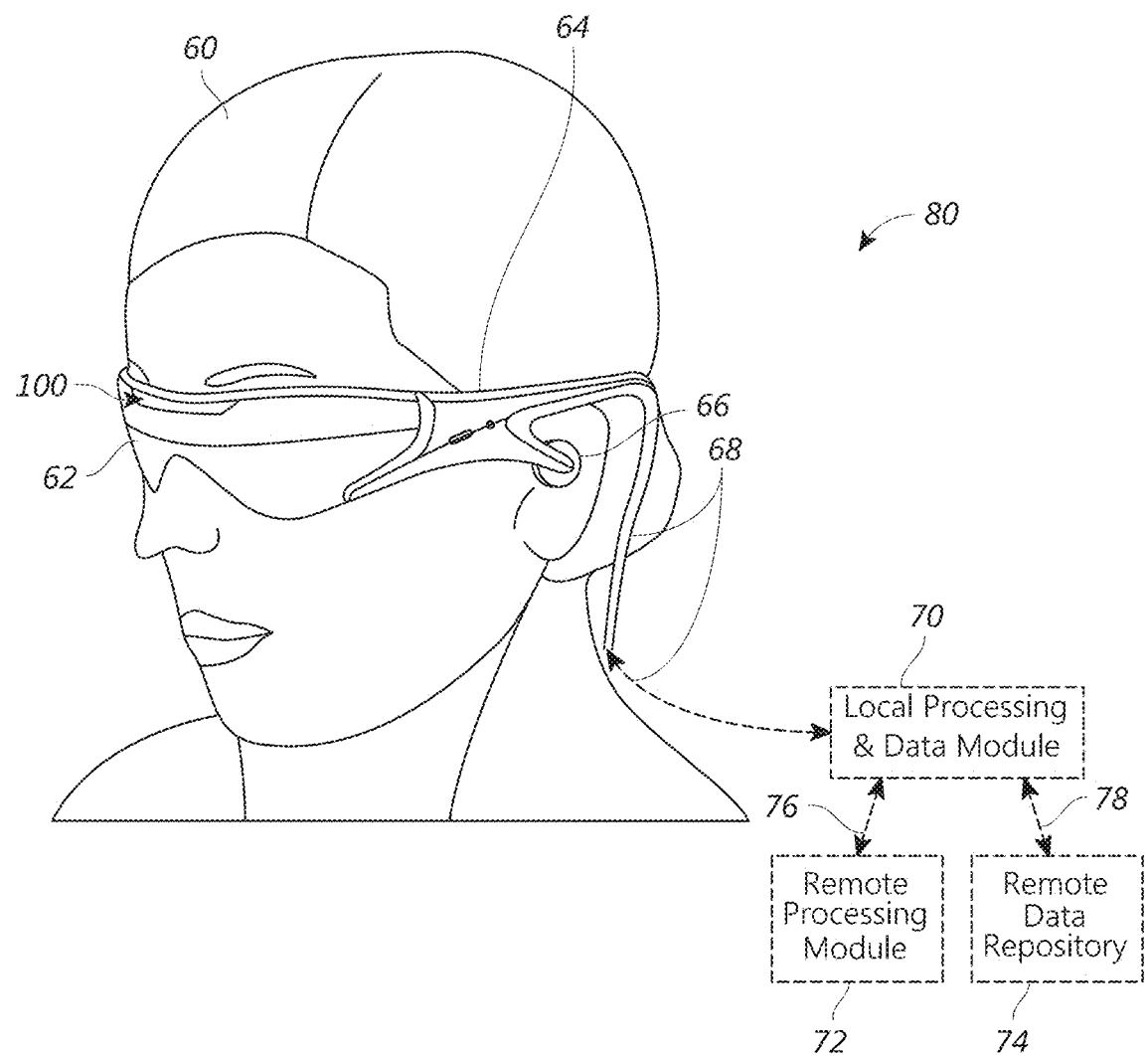
FIG. 2 illustrates an example of a wearable VR/AR/MR display system.

FIG. 2 illustrates an example of a wearable VR/AR/MR display system 80. The VR/AR/MR display system 80 includes a display 62, and various mechanical and electronic modules and systems to support the functioning of that display 62. The display 62 may be coupled to a frame 64, which is wearable by a user 60 and which positions the display 62 in front of the eyes of the user 60. A speaker 66 can be coupled to the frame 64 and positioned adjacent the ear canal of the user. Another speaker, not shown, can be positioned adjacent the other ear canal of the user to provide for stereo/shapeable sound control. The display 62 is operatively coupled, such as by a wired or wireless connection 68, to a local data processing module 70 which may be mounted in a variety of configurations, such as fixedly attached to the frame 64, fixedly attached to a helmet or hat worn by the user, embedded in headphones, or otherwise removably attached to the user 60 (e.g., in a backpack-style configuration, in a belt-coupling style configuration, etc.).

The local processing and data module 70 may include a processor, as well as digital memory, such as non-volatile memory (e.g., flash memory), both of which may be utilized to assist in the processing and storing of data. This includes data captured from sensors, such as image capture devices (e.g., cameras), microphones, inertial measurement units, accelerometers, compasses, GPS units, radio devices, and/or gyros. The sensors may be operatively coupled to the frame 64 or otherwise attached to the user 60. In some embodiments, all data is stored and all computations are performed in the local processing and data module, allowing fully autonomous use. Alternatively, or additionally, sensor data may be acquired and/or processed using a remote processing module 72 and/or remote data repository 74. The local processing and data module 70 may be operatively coupled by communication links (76, 78), such as via a wired or wireless communication links, to the remote processing module 72 and remote data repository 74 such that these remote modules (72, 74) are operatively coupled to each other and available as resources to the local processing and data module 70. In some embodiments, the remote processing module 72 may include one or more processors configured to analyze and process data (e.g., sensor data and/or image information). The remote data repository 74 may comprise a digital data storage facility, which may be available through the internet or other networking configuration in a "cloud" resource configuration.

The VR/AR/MR system 80 can also include a depth sensor 100. The depth sensor 100 takes measurements of a user's surroundings to determine information about the distances to various objects and features present in those surroundings. VR/AR/MR applications can make use of a variety of types of depth information, including short-range depth information (e.g., 0-2 meters), long-range depth information (e.g., 2-4 meters and beyond), and high dynamic range (HDR) depth information. The depth information provided by the depth sensor 100 can be used to allow a user to interact with the VR/AR/MR system and/or to allow the system to project virtual imagery into the user's real-world environment.

One application of long-range depth sensing in VR/AR/MR systems is using depth information to model the user's environment. For example, a depth sensor 100 can be used to determine the distances to walls and objects within a room. The resulting depth information can be used to create a 3D model of the room and its contents. In AR/MR systems, in particular, this can allow the system to project virtual imagery into the room in a realistic and interactive way. An example application of short-range depth sensing in VR/AR/MR systems is gesture recognition. For example, a VR/AR/MR system 80 can use depth sensing to track the movements of a user's hand so as to facilitate gesture recognition. The VR/AR/MR system 80 can then perform certain actions in response to the user's gestures.

Given that depth information can be used by the VR/AR/MR system 80 to provide a user with an interactive, immersive experience, it is advantageous for the depth sensor 100 to collect depth information relatively quickly and efficiently because this allows the VR/AR/MR system 80 to be more responsive. This can be particularly true for AR/MR applications, because these may be highly sensitive to discontinuities between the real world content surrounding the user and the virtual content which is projected into the user's environment by the system 80. This disclosure therefore describes improved techniques which can increase the efficiency and/or speed with which a variety of depth sensing information can be collected.

By way of background, one type of depth sensor is a 3D time-of-flight (TOF) camera. Generally speaking, a 3D TOF camera illuminates a scene using a light source. The TOF camera then observes and processes the light which reflects from the scene in order to determine information about the distances to various points/objects/features within the scene. Some TOF cameras perform depth measurements by emitting pulses of infrared light toward one or more points within a scene and then measuring the elapsed time until the light is reflected back from the scene. Based on the elapsed time, combined with knowledge of the speed of light, the camera can then determine the distance which the light has traveled. In addition, some TOF cameras can perform depth measurements by emitting a modulated light signal (e.g., a square or sinusoid wave) and then measuring the phase shift between the illumination light signal and the reflection light signal. These phase shift measurements are then translated to distance measurements.

In most depth sensing TOF cameras, the illumination is from a solid-state laser or light emitting diode (LED) operating in the near-infrared range (e.g., ~850 nm), which is invisible to human eyes. Typically, the illumination from the light source into the scene is designed to be relatively uniform. An imaging sensor designed to respond to the same spectrum as the illumination light receives the reflected light from the scene and converts the light to electrical signals. In some embodiments, the imaging sensor can be a CCD or CMOS sensor having a resolution of, for example, 224×172 pixels, though imaging sensors with greater or lesser resolution can also be used. Each pixel is located at a point in the image plane which corresponds to a separate point in the object space, or scene, within the field of view of the TOF camera. Therefore, the information collected at each pixel of the imaging sensor can be used to determine the distance to the point within the scene which corresponds to that particular pixel.

The light received by each pixel of the imaging sensor has an ambient component and a reflected component. Depth information is only embedded in the reflected component. To distinguish between these two components, the TOF camera may capture an image of the ambient infrared light just before, or just after, actively illuminating the scene with infrared light. This image of the ambient infrared light can be referred to as an intensity sub-frame image. By subtracting out, or otherwise removing, the intensity sub-frame image from other sub-frame images collected while actively illuminating the scene, the depth sensor 100 can differentiate the reflected component of infrared light from the background noise in the scene.

In order to allow for detection of phase shifts between the illumination component and the reflected component, the signal from the light source can be modulated. For example, a square wave modulation signal can be used. The image sensor then detects reflected light at multiple different times corresponding to different phase shifts with respect to the modulation signal. The different phase shifts may be, for example, Angle 1, Angle 2, Angle 3, and Angle 4, where Angle 2=Angle 1+Δ, Angle 3=Angle 1+2Δ, and Angle 4=Angle 1+3Δ, and where Angle 1 and Δ are predetermined angles. For example, Angle 1 may be 0° and Δ may be 90° such that the camera may detect the reflected light received at each pixel during periods of time which are phase shifted with respect to the modulation signal by 0°, 90°, 180°, and 270°. Each of these measurements can result in a separate phase sub-frame image captured by the camera sensor. The distances to the points in the scene corresponding to each of the sensor pixels can then be calculated from the four phase sub-frames using mathematical equations which are known in the art. Thus, each complete frame of depth information—from which a set of depth measurements (one per pixel) can be determined—is made up of several sub-frames of image data.

The modulated illumination signal is periodic and thus repeats itself every 360° of phase shift. Therefore, the fact that some TOF cameras measure depth based on phase shifts of the reflected light with respect to the modulated illumination signal means that the measured distances will be subject to aliasing effects. These aliasing effects can result in ambiguities in the measured distances. The distance where aliasing occurs (i.e., the ambiguity distance) is also the maximum unambiguous distance the TOF camera can measure. The maximum measurable distance can be extended by reducing the modulation frequency of the illumination light, but this can come at the cost of reduced depth measurement resolution. In order to resolve the depth ambiguities without compromising depth measurement resolution, TOF cameras can modulate the illumination light using two or more separate modulation signals having different frequencies (e.g., Fmod0 and Fmod1). Depth measurements are performed by measuring the phase shifts of the reflected light with respect to each of the multiple modulation frequencies. Since each modulation frequency is different, each one will have a different ambiguity distance. The actual distance to a given point in the scene is the distance where the measurements which were made using different modulation frequencies are in agreement.

In TOF cameras, a distance can be measured for every pixel in the camera sensor. This results in a depth map of the scene within the field of view of the camera. A depth map is a collection of points, or voxels, within a three-dimensional space, where each voxel is located at the distance measured by the corresponding sensor pixel. A depth map can be rendered in a three-dimensional space as a collection of points, or a point-cloud. The 3D points can be mathematically connected to form a mesh. The mesh can be used to model the scene, detect objects, etc. In addition, virtual content can be mapped onto the mesh by the VR/AR/MR system to provide life-like 3D virtual content that interacts with the user's real-life surroundings.

Various types of depth measurements can be advantageous for different purposes in the VR/AR/MR system 80. For example, close range, low frame rate depth measurements may be sufficient for detecting when the user's hand is present in the field of view of the depth sensor 100. Once the fact that the user's hand is present in the field of view of the depth sensor has been detected, close range, high frame rate depth measurements may be more useful for tracking the movements of the user's hands and thereby detecting a specific gesture being made. Meanwhile, long-range depth measurements at low or high frame rates can be useful for mapping the user's environment. In addition, a high dynamic range (HDR) depth measurement, from close range through long-range, can also be beneficial.

Given that many different types of depth measurements can be useful in the VR/AR/MR system 80, the depth sensor 100 can include multiple modes of operation to collect each of these different types of depth measurements. Each mode may consist, for example, of a sequence of operations to be performed by the depth sensor 100. Depending on the mode, each of these operations can involve different settings or parameters, such as exposure times, illumination light intensity, illumination modulation frequencies, etc. The following tables illustrate example operation sequences and configuration settings for some depth sensing modes.

Table 1 illustrates an example sequence of operations for a short-range, high frame rate depth sensing mode. In some embodiments, this mode of operation is used for sensing depths at ranges less than about 2 meters (depending upon modulation frequency and exposure time) with frame rates greater than about 20 Hz. In this particular embodiment, the frame rate is 45 Hz, which means that one complete frame of depth information is captured every 22.22 ms ($\frac{1}{45}$ s). In this case, each complete frame of depth information is based on an intensity sub-frame (for measuring ambient infrared light while the illumination source is off) and four phase sub-frames (which are captured while the illumination source is modulated).

TABLE 1

| Depth Sensor Mode | Operation Sequence Number | Operation |
|---|---|---|
| Short-range, high frame rate | 0 | Capture short-range intensity sub-frame using short exposure |
| | 1 | Capture short-range Angle 1 phase sub-frame using modulation frequency Fmod1 and short exposure |
| | 2 | Capture short-range Angle 2 phase sub-frame using modulation frequency Fmod1 and short exposure |
| | 3 | Capture short-range Angle 3 phase sub-frame using modulation frequency Fmod1 and short exposure |
| | 4 | Capture short-range Angle 4 phase sub-frame using modulation frequency Fmod1 and short exposure |
| | 5 | Relatively short delay (optional) |

The example sequence of operations for the short-range, high frame rate depth sensing mode begins with step 0, which is obtaining the intensity sub-frame. Then, during steps 1-4, the four phase sub-frames are captured. For short-range measurements, the exposure time (i.e., the time during which the image sensor captures light) for each of these sub-frames is typically less than about 0.5 ms. Each sub-frame also includes an associated read out time for transferring the captured image data from the image sensor. The read out time is typically less than about 1 ms.

The short-range, high frame rate mode of operation can optionally include a relatively short delay as step 5 of the operation sequence. This delay can be equal to, for example, the difference between the 22.22 ms period of the operation sequence and the total time required to complete steps 0-4. In other words, the optional short delay of step 5 can occupy any additional time during the period of the operation sequence which is not required in order to capture and read out the intensity sub-frame and the four phase sub-frames. Although Table 1 lists a specific order of operation steps for this particular depth sensing mode, the operation steps could alternatively be performed in different sequences. The same is also true for the other operation modes described herein.

Table 2 illustrates an example sequence of operations for a short-range, low frame rate depth sensing mode. This mode of operation may be used for sensing depths at ranges less than about 2 meters (depending upon modulation frequency and exposure time) with frame rates less than about 20 Hz. In this particular embodiment, the frame rate is 8 Hz, which means that one complete frame of depth information is captured every 125 ms. As with the preceding case, each complete frame of depth information is based on an intensity sub-frame and four phase sub-frames. Although the short-range, high frame rate mode has the advantage of producing depth measurements with better time resolution, the short-range, low frame rate mode can be beneficial—due to being less computationally intensive, thereby allowing the system to enter a low power mode and save energy—when lower time resolution is adequate for the task at hand.

TABLE 2

| Depth Sensor Mode | Operation Sequence Number | Operation |
|---|---|---|
| Short-range, low frame rate | 0 | Capture short-range intensity sub-frame using short exposure |
| | 1 | Capture short-range Angle 1 phase sub-frame using modulation frequency Fmod1 and short exposure |
| | 2 | Capture short-range Angle 2 phase sub-frame using modulation frequency Fmod1 and short exposure |
| | 3 | Capture short-range Angle 3 phase sub-frame using modulation frequency Fmod1 and short exposure |
| | 4 | Capture short-range Angle 4 phase sub-frame using modulation frequency Fmod1 and short exposure |
| | 5 | Relatively long delay |

The example sequence of operations for the short-range, low frame rate mode begins with step 0, which is obtaining the intensity sub-frame. Then, during steps 1-4, the four phase sub-frames are captured. Once again, for short-range measurements, the exposure time for each of these sub-frames is typically less than about 0.5 ms and the read out time for each sub-frame is typically less than about 1 ms. Steps 0-4 in Table 2 are the same as steps 0-4 in Table 1. Thus, the short-range, low frame rate mode of operation and the short-range, high frame rate mode of operation have these five steps in common.

But the short-range, low frame rate mode of operation also includes a relatively long delay as step 5 of the operation sequence. This delay can be equal to, for example, the difference between the 125 ms period of the operation sequence and the total time required to complete steps 0-4. The relatively long delay of step 5 occupies the time during the period of the operation sequence which is not required in order to capture and read out the intensity sub-frame and the four phase sub-frames. The difference, therefore, between the two short-range modes of operation respectively shown in Tables 1 and 2 relates to the difference between the relatively long delay of step 5 in Table 2 and the optional relatively short delay of step 5 in Table 1.

Table 3 illustrates an example sequence of operations for a long-range, high frame rate depth sensing mode. This mode of operation can be used, for example, to sense depths at ranges from about 2-4 meters (depending upon modulation frequency and exposure time) with frame rates greater than about 20 Hz. As with short-range depth data, each complete frame of long-range depth information is based on several sub-frames of image data. Once again, there is an intensity sub-frame for measuring ambient infrared light while the illumination source is off. But in the case of long-range depth data, there are eight phase sub-frames of image data: four phase sub-frames for each of two illumination modulation frequencies, Fmod1 and Fmod2.

TABLE 3

| Depth Sensor Mode | Operation Sequence Number | Operation |
|---|---|---|
| Long-range, high frame rate | 0 | Capture long-range intensity sub-frame using long exposure |
| | 1 | Capture long-range Angle 1 phase sub-frame using modulation frequency Fmod1 and long exposure |
| | 2 | Capture long-range Angle 2 phase sub-frame using modulation frequency Fmod1 and long exposure |
| | 3 | Capture long-range Angle 3 phase sub-frame using modulation frequency Fmod1 and long exposure |
| | 4 | Capture long-range Angle 4 phase sub-frame using modulation frequency Fmod1 and long exposure |
| | 5 | Capture long-range Angle 1 phase sub-frame using modulation frequency Fmod2 and long exposure |
| | 6 | Capture long-range Angle 2 phase sub-frame using modulation frequency Fmod2 and long exposure |
| | 7 | Capture long-range Angle 3 phase sub-frame using modulation frequency Fmod2 and long exposure |
| | 8 | Capture long-range Angle 4 phase sub-frame using modulation frequency Fmod2 and long exposure |
| | 9 | Relatively short delay (optional) |

The example sequence of operations for the long-range, high frame rate depth sensing mode begins with step 0, which is obtaining the intensity sub-frame. Then, during steps 1-4, the four phase sub-frames for the first modulation frequency, Fmod1, are captured, while, during steps 5-8, the four sub-frames for the second modulation frequency, Fmod 2, are captured. For long-range measurements, the exposure time (i.e., the time during which the image sensor captures light) for each of these sub-frames is longer than for short-range measurements, typically 2-3 ms. (Other parameters or settings for long-range sub-frames may also differ from short-range sub-frames.) Each sub-frame also includes an associated read out time of about 1 ms for transferring the captured image data from the image sensor.

The long-range, high frame rate mode of operation can optionally include a relatively short delay as step 9 of the operation sequence. This delay can be equal to, for example, the difference between the period of the operation sequence and the total time required to complete steps 0-8. In other words, the optional short delay of step 9 can occupy any additional time during the period of the operation sequence which is not required in order to capture and read out the intensity sub-frame and the eight phase sub-frames.

Table 4 illustrates an example sequence of operations for a long-range, low frame rate depth sensing mode. This mode of operation can be used for sensing depths at ranges from about 2-4 meters (depending upon modulation frequency and exposure time) with frame rates less than about 20 Hz. In this particular embodiment, the frame rate is 5 Hz, which means that one complete frame of depth information is captured every 200 ms. As with the preceding case, each complete frame of depth information is based on an intensity sub-frame and eight phase sub-frames.

TABLE 4

| Depth Sensor Mode | Operation Sequence Number | Operation |
| --- | --- | --- |
| Long-range, low frame rate | 0 | Capture long-range intensity sub-frame using long exposure |
| | 1 | Capture long-range Angle 1 phase sub-frame using modulation frequency Fmod1 and long exposure |
| | 2 | Capture long-range Angle 2 phase sub-frame using modulation frequency Fmod1 and long exposure |
| | 3 | Capture long-range Angle 3 phase sub-frame using modulation frequency Fmod1 and long exposure |
| | 4 | Capture long-range Angle 4 phase sub-frame using modulation frequency Fmod1 and long exposure |
| | 5 | Capture long-range Angle 1 phase sub-frame using modulation frequency Fmod2 and long exposure |
| | 6 | Capture long-range Angle 2 phase sub-frame using modulation frequency Fmod2 and long exposure |
| | 7 | Capture long-range Angle 3 phase sub-frame using modulation frequency Fmod2 and long exposure |
| | 8 | Capture long-range Angle 4 phase sub-frame using modulation frequency Fmod2 and long exposure |
| | 9 | Relatively long delay |

The example sequence of operations for the long-range, low frame rate mode begins with step 0, which is obtaining the intensity sub-frame. Then, during steps 1-8, the eight phase sub-frames are captured. Once again, for long-range measurements, the exposure time for each of these sub-frames is typically less than about 2-3 ms and each sub-frame also includes an associated read out time for transferring the captured image data from the image sensor. The read out time is typically less than about 1 ms. Steps 0-8 in Table 4 are the same as steps 0-8 in Table 3. The long-range, low frame rate mode of operation and the long-range, high frame rate mode of operation therefore have these nine steps in common.

But the long-range, low frame rate mode of operation also includes a relatively long delay as step 9 of the operation sequence. This delay can be equal to, for example, the difference between the 200 ms period of the operation sequence and the total time required to complete steps 0-9. In other words, the long delay of step 9 can occupy any additional time during the period of the operation sequence which is not required in order to capture and read out the intensity sub-frame and the eight phase sub-frames. The difference between the two modes of operation shown in Tables 3 and 4 therefore relates to the difference between the relatively long delay of step 9 in Table 4 and the optional relatively short delay of step 9 in Table 3.

In order to operate in a particular depth sensing mode (e.g., any of the depth sensing modes shown in Tables 1-4), the depth sensor 100 needs to be programmed with the appropriate sequence of operation steps (and associated settings). A conventional depth sensor typically has multiple memory bins for holding programming instructions. Each bin can hold, for example, one of the operations shown in the operation sequences of Tables 1-4. Thus, in order to program a TOF camera to operate in a short-range, high frame rate depth sensing mode (i.e., according to Table 1), five or six programming bins would typically be required. Similarly, a short-range, low frame rate mode (i.e., according to Table 2) would typically require six programming bins. Meanwhile, a long-range, high frame rate mode of operation (i.e., according to Table 3) would typically require 9 or 10 programming bins, while a long-range, low frame rate mode of operation (i.e., according to Table 4) would typically require 10 programming bins. Thus, using conventional methods, 6+6+10+10=32 memory bins could be required in order to program the depth sensor 100 to be capable of operating in all four of these depth sensing modes.

The depth sensor 100 can be programmed to operate in any of the depth sensing modes illustrated in Tables 1-4, as well as others, by loading the respective operation steps (and associated settings) into the sensor's memory bins. This programming process may take, for example, about 160 ms in some implementations, though it could take a longer or shorter period of time depending upon the particular implementation. Thus, if only one set of operation steps—corresponding to one depth sensing mode—are programmed into the memory bins of the depth sensor at a time, there is a cost of perhaps about 160 ms which may be required to re-program the depth senor so as to switch operation modes. If the depth sensor is not required to change modes very often, then this time cost may be acceptable. However, in the VR/AR/MR system 80, there may be a need to switch between depth sensing modes relatively often. The time required to re-program the depth sensor can therefore become problematic, as it may introduce noticeable lag in the responsiveness of the system. This and other problems are solved by the depth sensing techniques described herein.

Figure 3:
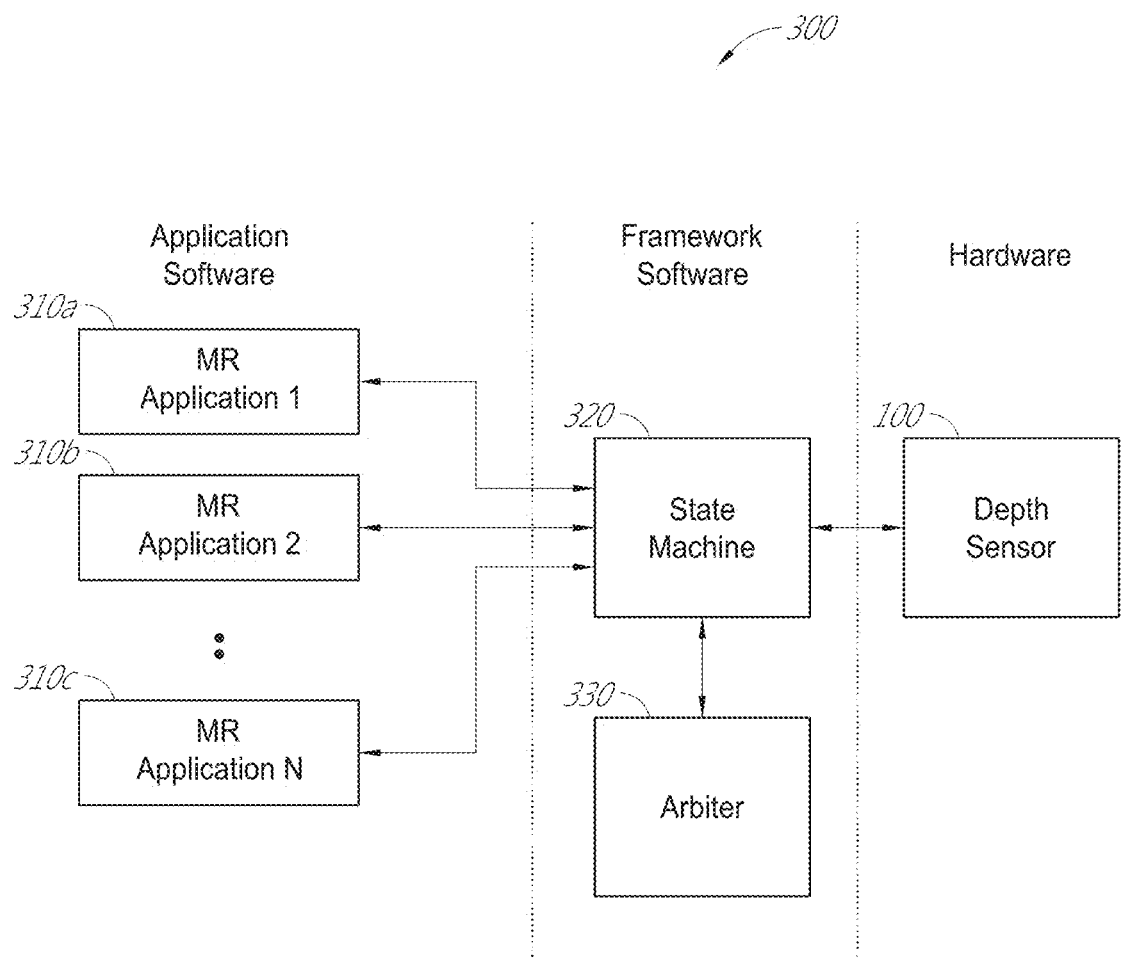
FIG. 3 illustrates an example depth sensing system.

FIG. 3 illustrates an example depth sensing system 300. The depth sensing system 300 includes a state machine 320, an arbiter 330, and the depth sensor 100 itself. The state machine 320 and the arbiter 330 can be implemented as hardware (e.g., one or more processors, including general-purpose processors, field programmable gate arrays (FPGAs), application-specific integrated circuits (ASICs), etc.) and/or software (e.g., computer-readable instructions stored in a memory, non-transient medium, etc.). FIG. 3 also shows several mixed reality (MR) applications 310 which are in communication with the depth sensing system 300. These are applications operating on the VR/AR/MR system 80. One of these applications 310 could be, for example, a gesture recognition application. Another could be a 3-D mapping application. Another could be a virtual content projection application. Each of these applications 310 may have a need for various different types of depth information at different times. It would not be unusual for different types of depth information to be needed by different applications 310 at or near the same moment in time. Thus, it is advantageous that the depth sensing system 300 be capable of switching between depth sensing modes to obtain the requested depth information as quickly and efficiently as possible. It should be noted that although only mixed reality applications are illustrated in FIG. 3, virtual reality and augmented reality applications can also communicate with the depth sensing system 300 to request and receive depth information.

Each application 310 can make requests to the depth sensing system 300 for various types of depth information as needed. The arbiter 330 is responsible for receiving the requests for depth information and for scheduling the depth sensing operations which will provide the requested depth information. In some embodiments, the arbiter 330 also prioritizes requests for depth measurements so as to serve more time-critical applications first. For example, in some embodiments, the arbiter 330 prioritizes depth sensing requests in the following order (though other prioritization schemes can also be used): 1) short-range, high frame rate depth measurements; 2) high dynamic range depth measurements (made up of short-range, low frame rate depth measurements interleaved with long-range, low frame rate depth measurements); 3) short-range, low frame rate depth measurements; 4) long-range, high frame rate depth measurements; 5) long-range, low frame rate depth measurements; and 6) idle state.

In some embodiments, the order in which depth measurement requests are prioritized is based on the priority of the requesting application. For example, since a VR/AR/MR system typically relies on user hand gestures to provide control inputs (because such a system does not typically have a touch panel, keyboard, or other physical input device), any user hand gesture may be assigned the highest priority. Accordingly, the highest priority mode in some embodiments may be the short-range, high frame rate depth measurements that are used to track hand gestures. It should be understood, however, that the various depth sensing modes can be assigned priorities in a variety of ways to accommodate different operating demands.

Once the requests for depth information are prioritized and scheduled by the arbiter 330, the state machine 320 is used to control the depth sensor 100 hardware so as to actually carry out the required measurements and return the requested data. As part of this task, the state machine 320 may perform various tasks, including storing operation steps (and associated settings) in the memory bins of the depth sensor 100; setting a selected depth sensing mode; and switching the depth sensing mode of the depth sensor 100 when required to do so based on input from the arbiter 330. The operation of the state machine 320 is described in more detail with respect to FIGS. 4 and 5.

Figure 4:
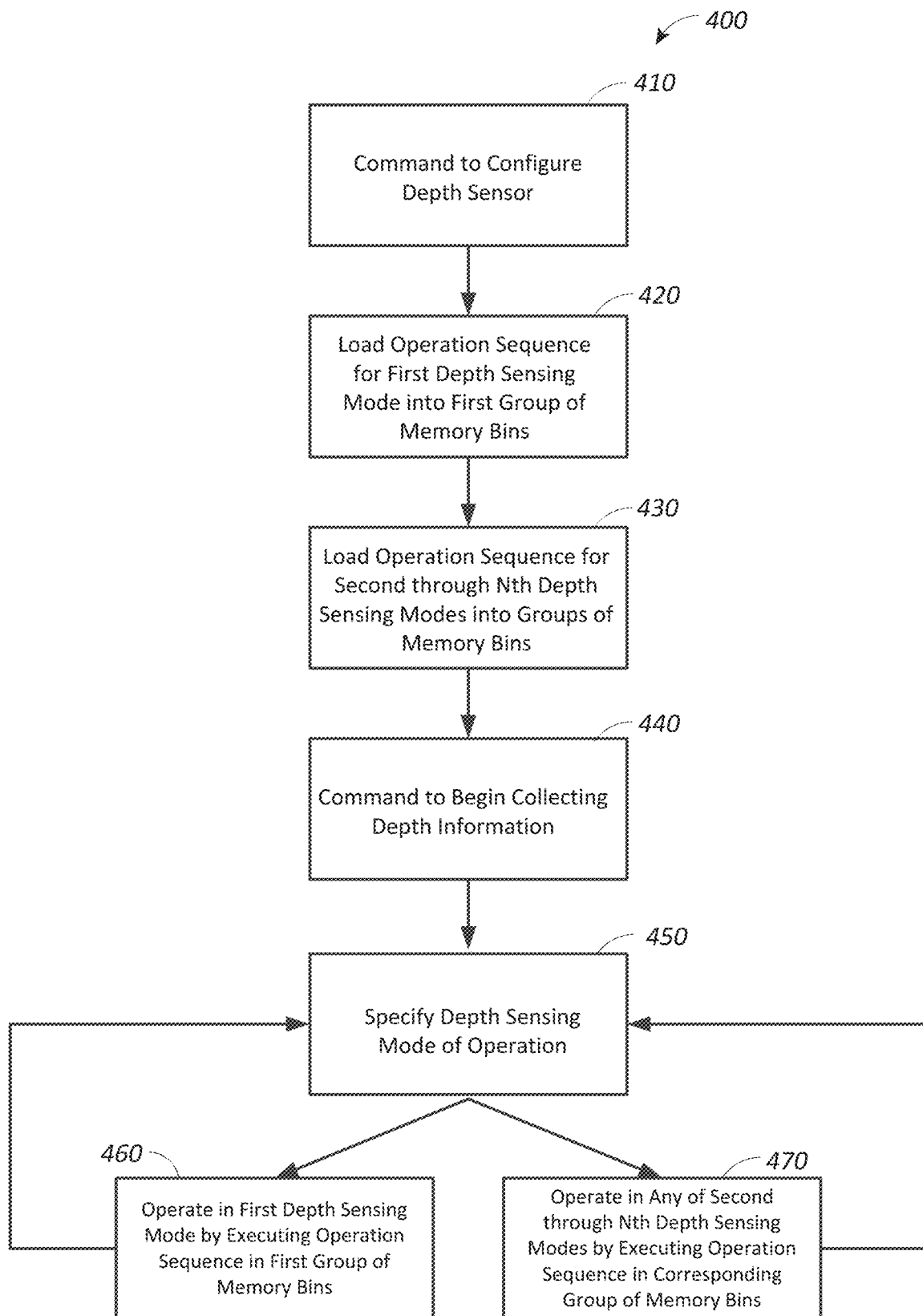
FIG. 4 illustrates an example of an improved method for efficiently operating a depth sensor in multiple depth sensing modes.

FIG. 4 illustrates an example of an improved method 400 for efficiently operating the depth sensor 100 in multiple depth sensing modes. The method 400 begins at block 410 with a command to configure the depth sensor 100. This type of command may be issued at, for example, startup or reset of the depth sensing system 300.

At block 420, the depth sensing system 300 begins configuration of the depth sensor 100 by loading an operation sequence for a first depth sensing mode into a first group of the memory bins of the depth sensor. For example, the first depth sensing mode may be a short-range, high frame rate mode. If that were the case, then the depth sensing system 300 would load the sequence of operation steps from Table 1 into the memory bins of the depth sensor. In a conventional depth sensing system, the depth sensor 100 would then proceed to operate in the first depth sensing mode to obtain depth measurements until a different depth sensing mode were required. However, the depth sensing system 300 described herein instead continues onto block 430 where it loads operation sequences for second through Nth depth sensing modes into groups of memory bins of the depth sensor 100. For example, the second depth sensing mode may be a long-range, high frame rate mode. If that were the case, then the depth sensing system 300 would load the sequence of operation steps from Table 3 into the memory bins of the depth sensor 100. Additional depth sensing modes could also be programmed during this configuration sequence, so long as available memory bins exist in the depth sensor 100. As discussed further below, these configuration steps can be performed before depth sensing begins, thereby avoiding configuration delay when changing between depth sensing modes.

At block 440, the method 400 continues with a command to begin collecting depth information. This command can be issued based on the depth sensing tasks scheduled by the arbiter 330. At block 450, the state machine 320 specifies which of the programmed depth sensing modes of operation is to be used. If the first depth sensing mode of operation is specified in block 450, then the method 400 continues onto block 460. At block 460, the depth sensor 100 operates in the first depth sensing mode by executing the operation sequence specified in the first group of memory bins. The depth sensor 100 proceeds to capture one or more frames of depth information while in the first depth sensing mode. Once this measurement is complete, the method returns back to block 450 where the depth sensing mode of operation can once again be specified.

Once back at block 450, if the depth sensing mode of operation changes, then the method 400 proceeds to block 470. At block 470, the depth sensor 100 can operate in any of the second through Nth depth sensing modes by executing the operation sequence specified in the corresponding group of memory bins. After collecting one or more frames of depth information according to any of the second through Nth depth sensing modes of operation, the method 400 returns back to block 450 and iteratively repeats according to the depth sensing tasks which are scheduled by the arbiter 330.

The method of operation shown in FIG. 4 is advantageous because it can improve depth sensing efficiency by reducing the amount of time which is dedicated to programming the depth sensor 100 due to changes in the requested depth sensing mode of operation. This is accomplished by programming the operation steps corresponding to multiple depth sensing modes into the memory bins of the depth sensor at the same time. For example, the first six memory bins of the depth sensor could be programmed with the operation steps of Table 2, while the next ten memory bins of the depth sensor could be programmed with the operation steps of Table 4. In this way, the depth sensor could operate in a short-range, low frame rate mode (corresponding to Table 2) by executing the instructions stored in the first six bins. Or the depth sensor could operate in a long-range, low frame rate mode (corresponding to Table 4) by executing the instructions stored in the next ten bins. The depth sensor can alternate between these modes without incurring the time penalty required to re-program the memory bins. Accordingly, the efficiency and speed of collection of depth information can be increased.

In some embodiments, the state machine 320 performs the operation of causing the depth sensor 100 to switch from one depth sensing mode to another depth sensing mode without requiring reprogramming of the memory bins. The state machine 320 provides the ability to alternate between depth sensing modes by executing sequences of operation steps from different sets/subsets of memory bins in the depth sensor 100. The state machine 320 can externally control the sets/subsets and sequences of memory bins from which the depth sensor 100 executes instructions. Without the state machine 320, the depth sensor 100 may simply cycle through the commands stored in its memory bins without the ability to select specific sets/subsets of commands to execute in order to achieve a desired depth sensing mode.

Figure 5:
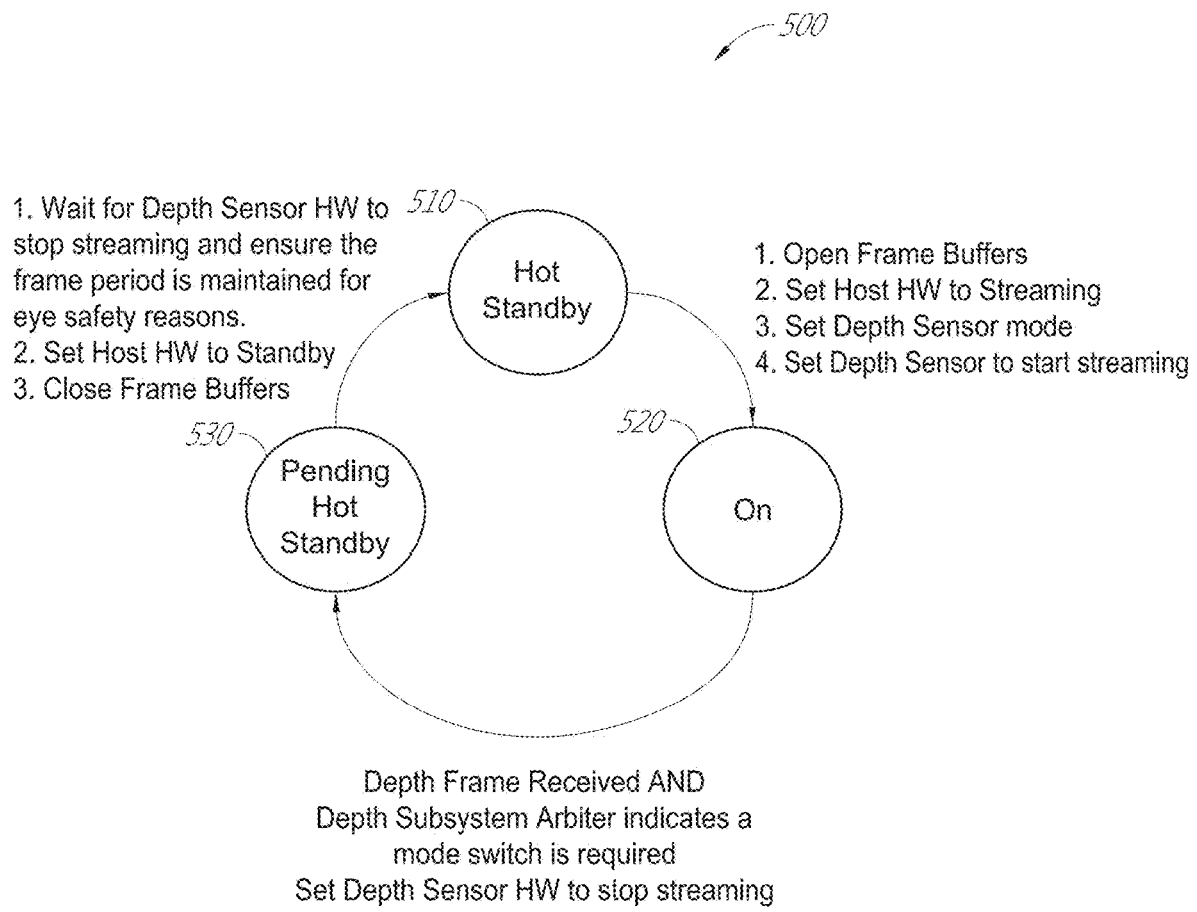
FIG. 5 is an example state diagram for efficiently operating a depth sensor in multiple depth sensing modes.

FIG. 5 is an example state diagram 500 for efficiently operating the depth sensor 100 in multiple depth sensing modes. The states shown in FIG. 5 can be implemented by the state machine 320, working in conjunction with the arbiter 330. In some embodiments, the depth sensing system 300 has three states: 1) a "Hot Standby" state 510; 2) an "On" state 520; and 3) a "Pending Hot Standby" state 530.

After being programmed according to blocks 410-430 in FIG. 4, the depth sensor 100 can be placed in Hot Standby state 510.

Based on the command to begin collecting depth information at block 440 of the method in FIG. 4, the state machine 320 places the depth sensor 100 in the On state 520. This state change can be accomplished by, for example, first opening the frame buffers to receive depth information. Next, the state machine 320 can set the host VR/AR/MR system 80 to accept streaming depth information. The state machine 320 can then set the depth sensing mode, according to block 450 of the method shown in FIG. 4. As discussed herein, the state machine 320 can set the depth sensing mode by specifying a set/subset and/or sequence of the operation steps which are stored in the memory bins of the depth sensor 100 to execute. For example, a first depth sensing mode can be specified by setting the depth sensor 100 to only execute the operation sequence specified by bins X-Y, where X is any integer and Y is any integer greater than X. Finally, the state machine 320 can set the depth sensor 100 to begin streaming depth information according to the specified depth sensing mode. The depth sensor 100 continues streaming frames of depth information, according to the specified mode, while in the On state 520 until each of the conditions for switching to the Pending Hot Standby state 530 is present.

In some embodiments, the state machine 320 switches the depth sensor from the On state 520 to the Pending Hot Standby state 530 when the following conditions are satisfied: 1) a completed frame of depth information has been received; and 2) the arbiter 330 indicates that a mode switch is required. Once these conditions are satisfied, the state machine 320 places the depth sensor 100 in the Pending Hot Standby state 530. In this state, the state machine 320 sets the depth sensor to cease streaming.

While in the Pending Hot Standby state 530, the state machine 320 ensures that the frame period of the current depth sensing mode is maintained. This is done for eye safety reasons to limit the amount of energy output by the depth sensor 100 per specified unit of time. For example, if a particular depth measurement is scheduled to be made at a frame rate of 5 Hz, then the frame period for that measurement is 200 ms. Typically, the power of the light source in the depth sensor 100 is set at a safe level based on that frame period. Therefore, in some embodiments, the state machine 320 does not permit the depth sensing mode to be changed until that 200 ms frame period has elapsed because doing so could immediately initiate a new depth measurement which could in turn cause additional radiation to be emitted during the 200 ms period, thereby possibly exceeding eye safety limits.

While still in the Pending Hot Standby state 530, the state machine 320 sets the host VR/AR/MR system 80 to a standby state and closes the frame buffers which are used to receive the depth information. Once these actions are complete, the depth sensing system state machine 320 transitions the depth sensor 100 into the Hot Standby state 510. The state machine 320, working in conjunction with the arbiter 330, then specifies the next depth sensing mode and the process can repeat. Once again, the next depth sensing mode is set by specifying a set/subset and/or sequence of the operation steps which are stored in the memory bins of the depth sensor 100 to be executed. And changing the depth sensing mode in this manner does not require the depth sensor 100 to be re-programmed because the operation steps for the next depth sensing mode have already been stored in the memory bins.

Although the method 400 shown in FIG. 4 can improve the efficiency of depth sensing operations, it may be limited by the number of available memory bins provided by the depth sensor 100. Depending on the desired number and type of depth sensing modes, there may be insufficient memory bins to accommodate the required sequences of operation instructions. For example, if the depth sensor 100 provides only 15 memory bins, then it would not be possible, according to conventional techniques, to simultaneously program the depth sensor with the operation sequences required by all four of the depth sensing modes described in Tables 1-4, let alone additional depth sensing modes. This is because those depth sensing modes collectively include more than 15 operation steps. Thus, even if the method 400 shown in FIG. 4 were implemented, it is possible—depending on the number of available memory bins—that the depth sensor 100 would still have to be periodically reprogrammed in order to offer all of the depth sensing modes described in Tables 1-4. As already discussed, this can result in a time penalty which is undesirable. This problem could be alleviated by providing the depth sensor with additional memory bins. However, doing so would increase the size and cost of the depth sensor. But there is another technique, illustrated in FIGS. 6-8, which can be used to further improve the efficiency of the depth sensor 100, even when the number of memory bins may be insufficient to accommodate operation sequences for all of the desired depth sensing modes. This technique leverages the fact that different depth sensing modes may have several operation steps in common such that these common steps need not necessarily be programmed into the depth sensor 100 more than once.

Figure 6:
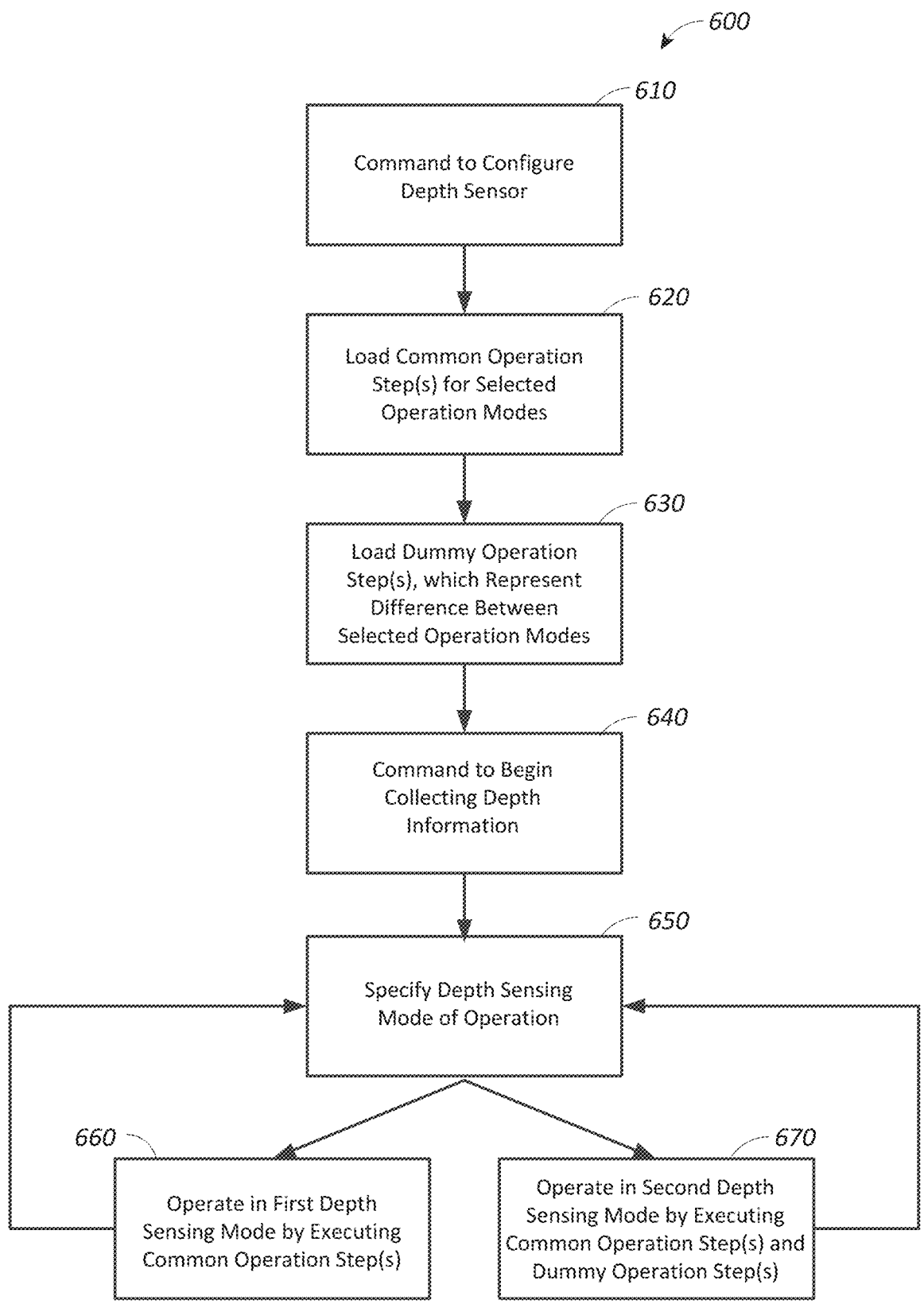
FIG. 6 illustrates another example of an improved method for efficiently operating a depth sensor in multiple depth sensing modes.

FIG. 6 illustrates another example of an improved method 600 for efficiently operating the depth sensor 100 in multiple depth sensing modes. This method 600 can be carried out using the same depth sensing system 300 shown in FIG. 3 and the same operational states shown in the state diagram 500 of FIG. 5. The method 600 begins at block 610 with the command to configure the depth sensor 100. Once again, this type of command may be issued at, for example, startup or reset of the depth sensing system 300. In some embodiments, the improved method 600 shown in FIG. 6 allows for configuration of the depth sensor 100 to be performed only once during each session of operation. For example, in some embodiments, after being initially programmed, the depth sensor 100 may not need to be programmed again until the host places the depth sensor in reset mode or until the depth sensor is power cycled.

At block 620, the depth sensing system 300 begins configuration of the depth sensor 100 by loading operation steps which are common between two or more depth sensing modes into the memory bins of the depth sensor. These common operation steps are ones which are the same in two or more modes of operation. For example, the steps (and associated settings) for capturing an intensity sub-frame and four phase sub-frames are the same for both a high frame rate, short-range depth measurement and a low frame rate, short-range depth measurement. With reference to Tables 1 and 2, these common operation steps correspond to Steps 0-4. Similarly, the steps (and associated settings) for capturing an intensity sub-frame and eight phase sub-frames are the same for both a high frame rate, long-range depth measurement and a low frame rate, long-range depth measurement. With reference to Tables 3 and 4, these common operation steps correspond to Steps 0-8.

At block 630, the depth sensing system 300 continues configuration of the depth sensor 100 by loading one or more dummy operation steps into the memory bins. In some embodiments, a dummy operation step is one which relates to the difference(s) between two or more modes of operation. By executing one or more dummy operation steps together with the sequence of common operation steps for two operation modes, one of the modes of operation can effectively be converted to the other.

For example, as already discussed herein, the difference between the high frame rate, short-range depth sensing mode (i.e., Table 1) and the low frame rate, short-range depth sensing mode (i.e., Table 2) relates to the difference between the respective frame periods, or, in other words, the difference between the amount of delay that is introduced before repeating the sub-frame capture sequence. In the case of the high frame rate, short-range depth measurement, a relatively short delay (or no delay at all) is used. While in the case of the low frame rate, short-range depth measurement, a relatively long delay is introduced so as to reduce the frame rate (and correspondingly increase the frame period). Therefore, for this pair of depth measurements (i.e., the high frame rate, short-range depth measurement and the low frame rate, short-range depth measurement), a dummy operation step can be defined as a delay which represents the difference between the relatively long delay of the low frame rate measurement and the relatively short optional delay of the high frame rate measurement. In other words, the dummy operation step for this pair of depth sensing modes can be a delay which equals the difference between the relatively long delay in Step 5 of Table 2 and the relatively short optional delay in Step 5 of Table 1. Similarly, a dummy operation step for the high frame rate, long-range measurement and the low frame rate, long-range measurement can be a delay which equals the difference between the relatively long delay in Step 5 of Table 4 and the relatively short optional delay and Step 5 of Table 3.

FIG. 7 is an example table 700 showing common operation steps and dummy operation steps for multiple depth sensing modes. In this example table 700, Step 0 is the dummy operation step for the pair of long-range depth measurements. This dummy operation step is a delay which, when added to the sequence of operations performed to execute the high frame rate, long-range measurement mode, converts that sequence of operations into the low frame rate, long-range measurement mode. This dummy operation step can be stored in the first memory bin of the depth sensor 100.

Meanwhile, Step 1 through Step m in the table 700 are the common operation steps between the high frame rate, long-range measurement mode and the low frame rate, long-range measurement mode. For the example TOF camera discussed herein, long-range depth measurements require nine total sub-frames (one intensity sub-frame and eight phase sub-frames). Therefore, the index m in the table 700 would be equal to 9. Accordingly, Steps 1-9 would be used to capture the intensity sub-frame and the eight phase sub-frames for long-range modes of operation. These operation steps can be stored in the next nine memory bins of the depth sensor 100 after the dummy operation step at Step 0. The next step is an eye safe dummy operation step, which is provided at Step m+1 in the table 700. This dummy operation step is discussed with respect to FIG. 9.

The table 700 in FIG. 7 also shows the common operation steps between the high frame rate, short-range measurement mode and the low frame rate, short-range measurement mode. These common operations are represented in the table 700 by Step m+2 through Step m+n+1. For the example TOF camera discussed herein, short-range measurements require five total sub-frames (one intensity sub-frame and four phase sub-frames). Therefore, the index n in the table 700 would be equal to five (and, as just discussed, the index m would be equal to 9). Accordingly, Steps 11-15 would be used to capture the intensity sub-frame and the four phase sub-frames for short-range modes of operation. These operation steps can be stored in the next five memory bins of the depth sensor 100.

Meanwhile, Step m+n+2 in the table 700 is the dummy operation step for the pair of short-range depth measurements. This dummy operation step is a delay which, when added to the sequence of operations performed to execute the high frame rate, short-range measurement mode, converts that sequence of operations into the low frame rate, short-range measurement mode. This dummy operation step can be stored in the next memory bin of the depth sensor 100.

Figure 8:
FIG. 8 is an example table which illustrates how the common operation steps and the dummy operation steps of FIG. 7 can be used to efficiently operate in multiple depth sensing modes.

As discussed further with respect to FIG. 8, various combinations of operation steps in the table 700 can be executed in the illustrated order so as to achieve a variety of depth sensing modes of operation.

After the depth sensor 100 has been programmed with the common operation steps and the dummy operation steps according to blocks 610-630, the method 600 shown in FIG. 6 continues at block 640 with a command to begin collecting depth information. At block 650, the depth sensing system 300 specifies a depth sensing mode of operation. This can be done by, for example, specifying which of the operation steps shown in the table 700 in FIG. 7 to execute so as to carry out the specified depth sensing mode of operation. This is discussed with respect to FIG. 8.

FIG. 8 is an example table 800 which illustrates how the common operation steps and the dummy operation steps of FIG. 7 can be used to efficiently operate in multiple depth sensing modes. As shown in FIG. 8, the high frame rate, long-range depth sensing mode (as shown in Table 3) can be carried out by executing Step 1 through Step m in the table 700 shown in FIG. 7. By executing these steps, the depth sensor 100 will collect the long-range intensity sub-frame and the eight long-range phase sub-frames during Step 1 through Step m. Meanwhile, if the depth sensing system 300 instead calls for a low frame rate, long-range depth measurement (as shown in Table 4), then this mode of operation can be accomplished by instead executing Step 0 through Step m. Since the dummy frame in Step 0 represents the difference between the high frame rate, long-range measurement and the low frame rate, long-range measurement, executing that step in addition to Step 1 through Step m effectively converts the mode of operation from the high frame rate, long-range measurement mode to the low frame rate, long-range measurement mode. Although the dummy operation at Step 0 is shown in the table 700 as being executed before collection of the sub-frames during Step 1 through Step m, in other embodiments it could be performed after collection of the sub-frames, or even in between the collection of two sub-frames.

FIG. 8 also shows that the high frame rate, short-range measurement depth sensing mode (as shown in Table 1) can be accomplished by executing Step m+2 through Step m+n+1 in the table 700 shown in FIG. 7. By executing these steps, the depth sensor 100 will collect the short-range intensity sub-frame and the four short-range phase sub-frames. Meanwhile, if the system instead calls for a low frame rate, short-range depth measurement (as shown in Table 2), then this mode of operation can be carried out by instead executing Step m+2 through Step m+n+2. Since the dummy frame in Step m+n+2 represents the difference between the high frame rate, short-range measurement and the low frame rate, short-range measurement, executing that step in addition to Step m+2 through Step m+n+1 effectively converts the mode of operation from the high frame rate, short-range measurement mode to the low frame rate, short-range measurement mode.

The table 800 in FIG. 8 also shows a high dynamic range depth sensing mode, which consists of interleaved low frame rate, short and long range measurements. This depth sensing mode is discussed with respect to FIG. 9.

After the depth sensing system 300 specifies the depth sensing mode of operation at block 650, the method 600 shown in FIG. 6 continues on to block 660 or block 670. The depth sensor 100 can operate in a first depth sensing mode by executing a group of common operation steps, as shown in block 660. The group of common operation steps could be, for example, Step 1 through Step m in the table 700 shown in FIG. 7. This would correspond to operation in the high frame rate, long-range depth sensing mode. Or, the group of common operation steps executed in block 660 could be Step m+2 through Step m+n+1 in the table 700 shown in FIG. 7. This would correspond to operation in the high frame rate, short-range depth sensing mode.

Alternatively, the depth sensor 100 can operate in a second depth sensing mode by executing a group of common operation steps and one or more dummy operation steps, as shown in block 670. The group of common operation steps could be, for example, Step 1 through Step m, and the dummy operation step could be Step 0, in the table 700 shown in FIG. 7. This would correspond to operation in the low frame rate, long-range depth sensing mode. Or, the group of common operation steps executed in block 660 could be Step m+2 through Step m+n+1, and the dummy operation step could be Step m+n+2, in the table 700 shown in FIG. 7. This would correspond to operation in the low frame rate, short-range depth sensing mode.

Whether the depth sensing system 300 proceeds from block 650 to block 660 or to block 670, the depth sensor 100 captures one or more frames of depth information while in the specified depth sensing mode. Once the measurement is complete, the method 600 returns back to block 650 where the depth sensing mode of operation can once again be specified.

The method 600 of operation shown in FIG. 6 is advantageous because it can improve depth sensing efficiency by reducing the amount of time which is dedicated to programming the depth sensor 100 in response to changes in the requested depth sensing mode of operation. According to this method 600, the depth sensor can alternate between multiple depth sensing modes without incurring the time penalty required to re-program the memory bins. And this can be accomplished using far fewer memory bins in the depth sensor 100 than would be required using conventional techniques. Accordingly, the efficiency and speed of collection of depth information can be increased. In addition, lower cost depth sensors with fewer memory bins can be used.

Figure 9:
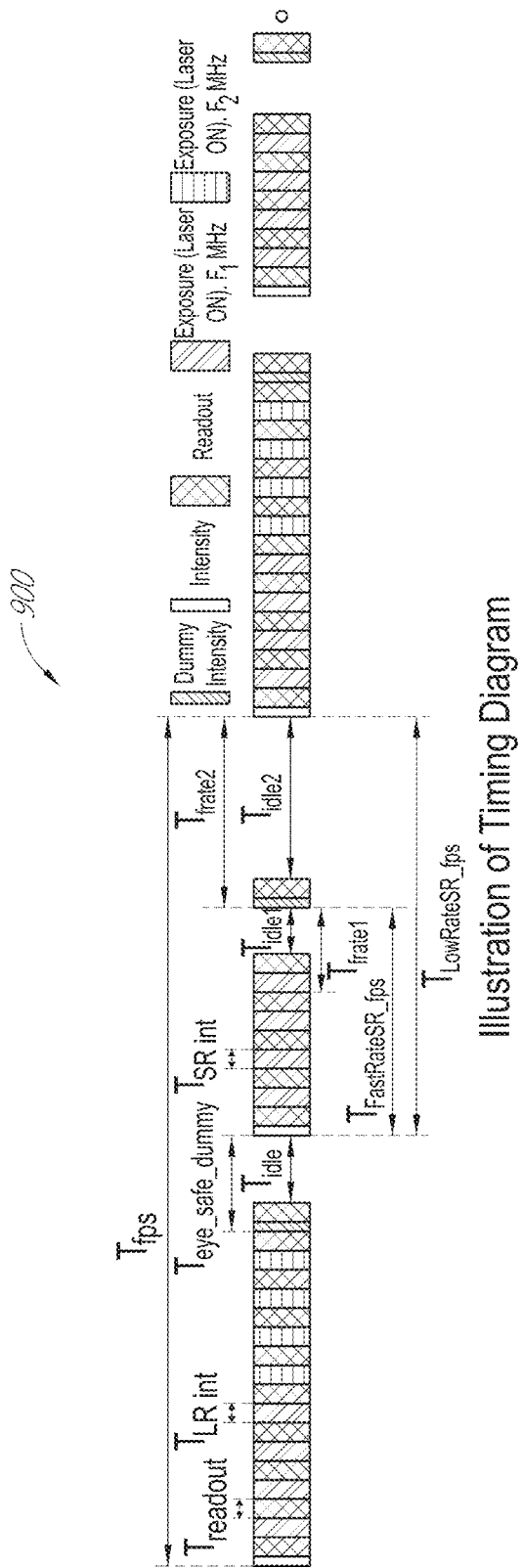
FIG. 9 is an example timing diagram for operating in a high dynamic range (HDR) depth sensing mode.

FIG. 9 is an example timing diagram for operating in a high dynamic range (HDR) depth sensing mode. The HDR depth sensing mode consists of long-range and short-range measurements interleaved together. Table 5 illustrates an example sequence of operations for the HDR depth sensing mode. In some embodiments, the frame rate for the HDR depth measurements is 5 Hz. The period for the HDR depth measurement is labeled as $T_{fps}$ in FIG. 9. This HDR depth sensing mode can be carried out using the method of FIG. 6 and the depth sensor memory bin programming scheme shown in FIG. 7.

The HDR depth sensing sequence starts with Step 0, where a long-range intensity sub-frame is captured. Then, during Steps 1-4, the depth sensor 100 captures four phase sub-frames using a first modulation frequency. As shown in FIG. 9, each phase sub-frame has an exposure time, or integration time, of $T_{LR\text{-}int}$. Each of these exposures is followed by a readout time, $T_{readout}$, for transferring the captured image data from the sensor. Then, at Steps 5-8, the depth sensor 100 captures four phase sub-frames using a second modulation frequency.

TABLE 5

| Depth Sensor Mode | Operation Sequence Number | Operation |
|---|---|---|
| High dynamic range (HDR) | 0 | Capture long-range intensity sub-frame using long exposure |
| | 1 | Capture long-range Angle 1 phase sub-frame using modulation frequency Fmod1 and long exposure |
| | 2 | Capture long-range Angle 2 phase sub-frame using modulation frequency Fmod1 and long exposure |
| | 3 | Capture long-range Angle 3 phase sub-frame using modulation frequency Fmod1 and long exposure |
| | 4 | Capture long-range Angle 4 phase sub-frame using modulation frequency Fmod1 and long exposure |
| | 5 | Capture long-range Angle 1 phase sub-frame using modulation frequency Fmod2 and long exposure |
| | 6 | Capture long-range Angle 2 phase sub-frame using modulation frequency Fmod2 and long exposure |
| | 7 | Capture long-range Angle 3 phase sub-frame using modulation frequency Fmod2 and long exposure |
| | 8 | Capture long-range Angle 4 phase sub-frame using modulation frequency Fmod2 and long exposure |
| | 9 | Eye-safety period |
| | 10 | Capture short-range intensity sub-frame using short exposure |
| | 11 | Capture short-range Angle 1 phase sub-frame using modulation frequency Fmod1 and short exposure |
| | 12 | Capture short-range Angle 2 phase sub-frame using modulation frequency Fmod1 and short exposure |
| | 13 | Capture short-range Angle 3 phase sub-frame using modulation frequency Fmod1 and short exposure |
| | 14 | Capture short-range Angle 4 phase sub-frame using modulation frequency Fmod1 and short exposure |
| | 15 | Optional delay |

The long-range measurement is followed at Step 9 by an eye safety delay, which is labeled as $T_{eye\_safe\_dummy}$ in FIG. 9. This delay can prevent the triggering of eye-safety circuits in the depth sensor 100 such that the light source of the depth sensor is not shut off in the middle of a measurement. This delay is another example of a dummy operation step and is discussed further below. As shown in FIG. 9, dummy operation steps which constitute delays may, in some embodiments, be implemented as an intensity sub-frame (including an exposure period and a readout period) followed by an idle period. The intensity sub-frame which is captured during a dummy operation step is typically not used to calculate depths.

Next, at Step 10 in Table 5, the depth sensor captures a short-range intensity sub-frame. This is followed at Steps 11-14 by four phase sub-frames. As shown in FIG. 9, each of these sub-frames has an exposure time of $T_{SR\_int}$ followed by a readout period. The short-range measurement made during Steps 10-14 can be followed by an optional delay at Step 15.

The HDR depth sensing mode shown in Table 5 and in FIG. 9 has many operation steps which are common with other depth sensing modes which have been discussed herein. For example, Steps 0-8 in Table 5 are the same as those used by a high frame rate, long-range depth measurement. Accordingly, this portion of the HDR depth sensing mode can be implemented by executing Step 1 through Step m in the programming scheme 700 shown in FIG. 7. Similarly, Steps 10-14 in Table 5 are the same as those used by a high frame rate, short-range depth measurement. Thus, they can be implemented as Step m+2 through Step m+n+1 in the programming scheme 700 shown in FIG. 7.

The differences between the HDR depth sensing mode as compared to the high frame rate, long-range mode and the high frame rate, short-range mode are the eye safety period at Step 9 in Table 5 and the optional delay at Step 15. These differences can be implemented by appropriate dummy operation frames, as discussed herein. For example, the eye safety period can be implemented by the eye safe dummy operation step shown at Step m+1 in the programming scheme 700 shown in FIG. 7. And the optional delay at Step 15 in Table 5 can be implemented using the dummy operation at Step m+n+2 of the programming scheme 700 shown in FIG. 7.

It follows, as shown in FIG. 8, that the complete HDR depth sensing mode (interleaved long-range and short-range depth measurements) can be implemented by executing Step 1 through Step m+n+2 of the programming scheme 700 shown in FIG. 7. The HDR depth sensing mode of Table 5 is therefore an example of how additional modes can be implemented from the common and dummy operation steps shown in FIG. 7.

The foregoing disclosure describes various efficient depth sensing techniques for use in VR/AR/MR systems. Although these techniques are discussed with respect to depth sensors specifically, the same techniques can also be applied to other types of sensors and are not limited strictly to depth sensors.

EXAMPLE EMBODIMENTS

In some embodiments, a method comprises: providing a sensor with a sequence of common operation steps which are included in both a first sequence of operation steps which define a first mode of operation and a second sequence of operation steps which define a second mode of operation; providing the sensor with one or more dummy operation steps which relate to a difference between the first mode of operation and the second mode of operation; operating the sensor in the first mode of operation by causing it to execute at least the common operation steps; and operating the sensor in the second mode of operation by causing it to execute the common operation steps and at least one dummy operation step.

According to any of these embodiments, the first mode of operation can comprise executing at least the common operation steps at a first rate, and the second mode of operation can comprise performing the common operation steps and at least one dummy operation step at a second rate which is slower than the first rate.

According to any of these embodiments, at least one of the one or more dummy operation steps can comprise a delay.

According to any of these embodiments, providing the sensor with the sequence of common operation steps and the one or more dummy operation steps can comprise storing those operation steps in a sensor memory.

According to any of these embodiments, switching the sensor between the first and second modes of operation may not require any additional act to store an operation step in the sensor memory.

According to any of these embodiments, the sensor can comprise a depth sensor.

According to any of these embodiments, the depth sensor can comprise a time-of-flight camera.

According to any of these embodiments, the first mode of operation can comprise a depth sensing mode with a first frame rate and the second mode of operation can comprise a depth sensing mode with a second frame rate which is slower than the first frame rate.

According to any of these embodiments, the method can further comprise providing depth information from the depth sensor to a virtual reality, augmented reality, or mixed reality display system.

In some embodiments, a system comprises: a processor configured to execute a method comprising: providing a sensor with a sequence of common operation steps which are included in both a first sequence of operation steps which define a first mode of operation and a second sequence of operation steps which define a second mode of operation; providing the sensor with one or more dummy operation steps which relate to a difference between the first mode of operation and the second mode of operation; operating the sensor in the first mode of operation by causing it to execute at least the common operation steps; and operating the sensor in the second mode of operation by causing it to execute the common operation steps and at least one dummy operation step.

According to any of these embodiments, the first mode of operation can comprise executing at least the common operation steps at a first rate, and the second mode of operation can comprise performing the common operation steps and at least one dummy operation step at a second rate which is slower than the first rate.

According to any of these embodiments, at least one of the one or more dummy operation steps can comprise a delay.

According to any of these embodiments, providing the sensor with the sequence of common operation steps and the one or more dummy operation steps can comprise storing those operation steps in a sensor memory.

According to any of these embodiments, switching the sensor between the first and second modes of operation may not require any additional act to store an operation step in the sensor memory.

According to any of these embodiments, the sensor can comprise a depth sensor.

According to any of these embodiments, the depth sensor can comprise a time-of-flight camera.

According to any of these embodiments, the first mode of operation can comprise a depth sensing mode with a first frame rate and the second mode of operation can comprise a depth sensing mode with a second frame rate which is slower than the first frame rate.

According to any of these embodiments, the system can be integrated in a virtual reality, augmented reality, or mixed reality display system.

According to any of these embodiments, the processor can comprise a state machine.

According to any of these embodiments, the system can further comprise an arbiter to receive requests to operate the sensor in the first mode or the second mode, and the arbiter can be configured to schedule and prioritize the requests.

According to any of these embodiments, the system can further comprise the sensor.

In some embodiments, a method comprises: receiving a first request for a first type of depth measurement; receiving a second request for a second type of depth measurement; assigning a first priority to the first request; assigning a second priority to the second request; and causing a depth sensor to first obtain the first type of depth measurement if the first priority is higher than the second priority, or causing the depth sensor to first obtain the second type of depth measurement if the second priority is higher than the first priority.

According to any of these embodiments, the first priority can be assigned based on a priority of a first application requesting the first type of depth measurement, and the second priority can be assigned based on a priority of a second application requesting the second type of depth measurement.

In some embodiments, a system comprises: an arbiter configured to receive a first request for a first type of depth measurement and a second request for a second type of depth measurement, the arbiter being configured to assign a first priority to the first request and a second priority to the second request; and a processor configured to cause a depth sensor to first obtain the first type of depth measurement if the first priority is higher than the second priority, or to cause the depth sensor to first obtain the second type of depth measurement if the second priority is higher than the first priority.

According to any of these embodiments, the arbiter can be configured to assign the first priority based on a priority of a first application requesting the first type of depth measurement, and to assign the second priority based on a priority of a second application requesting the second type of depth measurement.

According to any of these embodiments, the system can be integrated in a virtual, augmented, or mixed reality display system.

In some embodiments, a method comprises: performing a configuration operation for a depth sensor, the configuration operation comprising: storing a first sequence of operation steps which define a first depth sensing mode of operation in a memory of the depth sensor; and storing a second sequence of operation steps which define a second depth sensing mode of operation in the memory of the depth sensor; receiving a first request for depth measurements according to the first depth sensing mode of operation; in response to the first request, operating the depth sensor in the first mode of operation by causing it to execute the first sequence of operation steps; receiving a second request for depth measurements according to the second depth sensing mode of operation; and in response to the second request, and without performing an additional configuration operation, operating the depth sensor in the second mode of operation by causing it to execute the second sequence of operation steps.

According to any of these embodiments, the depth sensor can comprise a time-of-flight camera.

According to any of these embodiments, the first depth sensing mode of operation can correspond to a first distance range of measurements and the second depth sensing mode of operation can correspond to a second distance range of measurements which is different from the first distance range of measurements.

According to any of these embodiments, the first depth sensing mode of operation can correspond to a first frame rate and the second depth sensing mode of operation can correspond to a second frame rate which is slower than the first frame rate.

According to any of these embodiments, the method can further comprise providing depth information from the depth sensor to a virtual reality, augmented reality, or mixed reality display system.

In some embodiments, a system comprises: a processor configured to execute a method comprising: performing a configuration operation for a depth sensor, the configuration operation comprising storing a first sequence of operation steps which define a first depth sensing mode of operation in a memory of the depth sensor, and storing a second sequence of operation steps which define a second depth sensing mode of operation in the memory of the depth sensor; receiving a first request for depth measurements according to the first depth sensing mode of operation; in response to the first request, operating the depth sensor in the first mode of operation by causing it to execute the first sequence of operation steps; receiving a second request for depth measurements according to the second depth sensing mode of operation; and in response to the second request, and without performing an additional configuration operation, operating the depth sensor in the second mode of operation by causing it to execute the second sequence of operation steps.

According to any of these embodiments, the depth sensor can comprise a time-of-flight camera.

According to any of these embodiments, the first depth sensing mode of operation can correspond to a first distance range of measurements and the second depth sensing mode of operation can correspond to a second distance range of measurements which is different from the first distance range of measurements.

According to any of these embodiments, the first depth sensing mode of operation can correspond to a first frame rate and the second depth sensing mode of operation can correspond to a second frame rate which is slower than the first frame rate.

According to any of these embodiments, the system can be integrated in a virtual, augmented, or mixed reality display system.

In some embodiments, a non-transitory computer-readable medium comprises code which, when read by a computing device, causes the computing device to perform a method comprising: providing the sensor with a sequence of common operation steps which are included in both a first sequence of operation steps which define a first mode of operation and a second sequence of operation steps which define a second mode of operation; providing the sensor with one or more dummy operation steps which relate to the difference between the first mode of operation and the second mode of operation; operating the sensor in the first mode of operation by causing it to execute at least the common operation steps; and operating the sensor in the second mode of operation by causing it to execute the common operation steps and at least one dummy operation step.

According to any of these embodiments, the first mode of operation can comprise executing at least the common operation steps at a first rate, and the second mode of operation can comprise performing the common operation steps and at least one dummy operation step at a second rate which is slower than the first rate.

According to any of these embodiments, at least one of the one or more dummy operation steps can comprise a delay.

According to any of these embodiments, providing the sensor with the sequence of common operation steps and the one or more dummy operation steps can comprise storing those operation steps in a sensor memory.

According to any of these embodiments, switching the sensor between the first and second modes of operation may not require any additional act to store an operation step in the sensor memory.

According to any of these embodiments, the sensor can comprise a depth sensor.

According to any of these embodiments, the depth sensor can comprise a time-of-flight camera.

According to any of these embodiments, the first mode of operation can comprise a depth sensing mode with a first frame rate and the second mode of operation can comprise a depth sensing mode with a second frame rate which is slower than the first frame rate.

According to any of these embodiments, the computer-readable medium can comprise code which further causes the computing device to provide depth information from the depth sensor to a virtual reality, augmented reality, or mixed reality display system.

In some embodiments, a non-transitory computer-readable medium comprises code which, when read by a computing device, causes the computing device to perform a method comprising: receiving a first request for a first type of depth measurement; receiving a second request for a second type of depth measurement; assigning a first priority to the first request; assigning a second priority to the second request; and causing a depth sensor to first obtain the first type of depth measurement if the first priority is higher than the second priority, or causing the depth sensor to first obtain the second type of depth measurement if the second priority is higher than the first priority.

According to any of these embodiments, the first priority can be assigned based on a priority of a first application requesting the first type of depth measurement, and the second priority can be assigned based on a priority of a second application requesting the second type of depth measurement.

In some embodiments, a non-transitory computer-readable medium comprises code which, when read by a computing device, causes the computing device to perform a method for operating a depth sensor, the method comprising: performing a configuration operation for a depth sensor, the configuration operation comprising: storing a first sequence of operation steps which define a first depth sensing mode of operation in a memory of the depth sensor; and storing a second sequence of operation steps which define a second depth sensing mode of operation in the memory of the depth sensor; receiving a first request for depth measurements according to the first depth sensing mode of operation; in response to the first request, operating the depth sensor in the first mode of operation by causing it to execute the first sequence of operation steps; receiving a second request for depth measurements according to the second depth sensing mode of operation; and in response to the second request, and without performing an additional configuration operation, operating the depth sensor in the second mode of operation by causing it to execute the second sequence of operation steps.

According to any of these embodiments, the depth sensor can comprise a time-of-flight camera.

According to any of these embodiments, the first depth sensing mode of operation can correspond to a first distance range of measurements and the second depth sensing mode of operation can correspond to a second distance range of measurements which is different from the first distance range of measurements.

According to any of these embodiments, the first depth sensing mode of operation can correspond to a first frame rate and the second depth sensing mode of operation can correspond to a second frame rate which is slower than the first frame rate.

According to any of these embodiments, the computer-readable medium can further comprise code which causes the computing device to provide depth information from the depth sensor to a virtual reality, augmented reality, or mixed reality display system.

ADDITIONAL CONSIDERATIONS

For purposes of summarizing the disclosure, certain aspects, advantages and features of the invention have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

Embodiments have been described in connection with the accompanying drawings. However, it should be understood that the figures are not drawn to scale. Distances, angles, etc. are merely illustrative and do not necessarily bear an exact relationship to actual dimensions and layout of the devices illustrated. In addition, the foregoing embodiments have been described at a level of detail to allow one of ordinary skill in the art to make and use the devices, systems, methods, etc. described herein. A wide variety of variation is possible. Components, elements, and/or steps may be altered, added, removed, or rearranged.

The devices and methods described herein can advantageously be at least partially implemented using, for example, computer software, hardware, firmware, or any combination of software, hardware, and firmware. Software modules can comprise computer executable code, stored in a computer's memory, for performing the functions described herein. In some embodiments, computer-executable code is executed by one or more general purpose computers. However, a skilled artisan will appreciate, in light of this disclosure, that any module that can be implemented using software to be executed on a general purpose computer can also be implemented using a different combination of hardware, software, or firmware. For example, such a module can be implemented completely in hardware using a combination of integrated circuits. Alternatively or additionally, such a module can be implemented completely or partially using specialized computers designed to perform the particular functions described herein rather than by general purpose computers. In addition, where methods are described that are, or could be, at least in part carried out by computer software, it should be understood that such methods can be provided on non-transitory computer-readable media (e.g., optical disks such as CDs or DVDs, hard disk drives, flash memories, diskettes, or the like) that, when read by a computer or other processing device, cause it to carry out the method.

While certain embodiments have been explicitly described, other embodiments will become apparent to those of ordinary skill in the art based on this disclosure.

What is claimed is:

1. A method comprising:
providing a depth sensor with a plurality of common operation steps to be used in both a first mode of operation and a second mode of operation; and
providing the depth sensor with one or more dummy operation steps to be used in the second mode of operation but not the first mode of operation, wherein the one or more dummy operation steps are not independent steps provided in a definition of the first mode of operation or in a definition of the second mode of operation but instead result in one or more steps provided in the definition of the second mode of operation only when executed in combination with one or more of the common operation steps.

2. The method of claim 1, wherein the first mode of operation comprises executing at least the common operation steps at a first rate, and wherein the second mode of operation comprises performing the common operation steps and at least one dummy operation step at a second rate which is slower than the first rate.

3. The method of claim 2, wherein at least one of the one or more dummy operation steps comprises a delay.

4. The method of claim 1, wherein providing the depth sensor with the sequence of common operation steps and the one or more dummy operation steps comprises storing those operation steps in a depth sensor memory.

5. The method of claim 4, further comprising switching the depth sensor between the first and second modes of operation does without an additional act to store an operation step in the depth sensor memory.

6. The method of claim 1, wherein the depth sensor comprises a time-of-flight camera.

7. The method of claim 1, wherein the first mode of operation comprises a depth sensing mode with a first frame rate and the second mode of operation comprises a depth sensing mode with a second frame rate which is slower than the first frame rate.

8. The method of claim 1, further comprising providing depth information from the depth sensor to a virtual reality, augmented reality, or mixed reality display system.

9. The method of claim 1, wherein the one or more dummy operation steps comprise a time delay difference between a first time delay that is a step in the first mode of operation and a second time delay that is a step in the second mode of operation.

10. A system comprising:
a depth sensor; and
a processor configured
to provide the depth sensor with a plurality of common operation steps to be used in both a first mode of operation and a second mode of operation; and
to provide the depth sensor with one or more dummy operation steps to be used in the second mode of operation but not the first mode of operation, wherein the one or more dummy operation steps are not independent steps provided in a definition of the first mode of operation or in a definition of the second mode of operation but instead result in one or more steps provided in the definition of the second mode of operation only when executed in combination with one or more of the common operation steps.

11. The system of claim 10, wherein the first mode of operation comprises executing at least the common operation steps at a first rate, and wherein the second mode of operation comprises performing the common operation steps and at least one dummy operation step at a second rate which is slower than the first rate.

12. The system of claim 11, wherein at least one of the one or more dummy operation steps comprises a delay.

13. The system of claim 10, wherein providing the depth sensor with the sequence of common operation steps and the one or more dummy operation steps comprises storing those operation steps in a depth sensor memory.

14. The system of claim 13, wherein the processor is further configured to switch the depth sensor between the first and second modes of operation without any additional act to store an operation step in the depth sensor memory.

15. The system of claim 10, wherein the depth sensor comprises a time-of-flight camera.

16. The system of claim 10, wherein the first mode of operation comprises a depth sensing mode with a first frame rate and the second mode of operation comprises a depth sensing mode with a second frame rate which is slower than the first frame rate.

17. The system of claim 10, wherein the system is integrated in a virtual reality, augmented reality, or mixed reality display system.

18. The system of claim 10, wherein the processor comprises a state machine.

19. The system of claim 10, further comprising an arbiter to receive requests to operate the depth sensor in the first mode or the second mode, wherein the arbiter is configured to schedule and prioritize the requests.

20. The system of claim 10, wherein the one or more dummy operation steps comprise a time delay difference between a first time delay that is a step in the first mode of operation and a second time delay that is a step in the second mode of operation.

* * * * *